US009174122B2

(12) United States Patent
Miyazaki

(10) Patent No.: US 9,174,122 B2
(45) Date of Patent: Nov. 3, 2015

(54) GAME CONTROLLER

(75) Inventor: Yoshio Miyazaki, Kanagawa (JP)

(73) Assignees: SONY CORPORATION, Tokyo (JP); SONY COMPUTER ENTERTAINMENT INC., Tokyo (JP)

( * ) Notice: Subject to any disclaimer, the term of this patent is extended or adjusted under 35 U.S.C. 154(b) by 1611 days.

(21) Appl. No.: 12/169,856

(22) Filed: Jul. 9, 2008

(65) Prior Publication Data

US 2009/0017911 A1  Jan. 15, 2009

(30) Foreign Application Priority Data

Jul. 9, 2007 (JP) ................................. 2007-180395
Sep. 19, 2007 (JP) ................................. 2007-243065

(51) Int. Cl.
*A63F 9/24* (2006.01)
*A63F 13/00* (2014.01)
*G06F 17/00* (2006.01)
*G06F 19/00* (2011.01)
*G06F 3/033* (2013.01)
*A63F 13/20* (2014.01)

(52) U.S. Cl.
CPC .......... *A63F 13/06* (2013.01); *A63F 2300/1012* (2013.01); *A63F 2300/1037* (2013.01)

(58) Field of Classification Search
CPC ............................... H04M 1/233; G06F 3/033
USPC ................................. 345/619, 161; 463/37, 39
See application file for complete search history.

(56) References Cited

U.S. PATENT DOCUMENTS

| 5,573,013 A * | 11/1996 | Conlan ........................... 600/595 |
| 6,704,002 B1 * | 3/2004 | Martin et al. .................. 345/161 |
| 6,939,231 B2 * | 9/2005 | Mantyjarvi et al. ............ 463/30 |
| 2005/0134562 A1 * | 6/2005 | Grant et al. ..................... 345/161 |
| 2005/0186935 A1 * | 8/2005 | Kawama et al. ............... 455/334 |
| 2007/0139385 A1 * | 6/2007 | Inokuchi ......................... 345/173 |
| 2007/0201848 A1 * | 8/2007 | Taguchi ........................... 396/55 |

FOREIGN PATENT DOCUMENTS

| CN | 1919390 | 2/2007 |
| EP | 1 757 345 | 2/2007 |

OTHER PUBLICATIONS

European Search Report dated Nov. 13, 2008, from the corresponding European Application.
Chinese First Office Action dated Mar. 19, 2012, from corresponding Chinese Application No. 200810128346.4.
Chinese Rejection Decision dated Aug. 24, 2012, from corresponding Chinese Application No. 200810128346.4.

* cited by examiner

*Primary Examiner* — Kang Hu
*Assistant Examiner* — Syvila Weatherford
(74) *Attorney, Agent, or Firm* — Katten Muchin Rosenman LLP

(57) ABSTRACT

A technique which easily removes the motion element of the game controller which is attributed to the vibrating motion of a vibrator from the output data of an acceleration sensor or reduces the element can be achieved by the present invention. In a game controller, an acceleration sensor detects the movement of the game controller. LPF is installed at the output of the acceleration sensor. Vibrators are installed inside of a housing. The cutoff frequency of LPF is set lower than the peak value of the natural frequency of the game controller. The cutoff frequency of LPF may be set to two thirds or less of the peak value of the natural frequency of the game controller.

9 Claims, 15 Drawing Sheets

GAME CONTROLLER

BACKGROUND OF THE INVENTION

1. Field of the Invention

The present invention relates to game controller techniques.

2. Description of the Related Art

In game systems, game controllers provided with vibrators such as motors have become widely used. A user can be given a sense of reality by having the vibrator driven as a game progresses.

In recent years, the use of the posture and the movement of a game controller as game operation data input to a game device is realized by installing a motion sensor in the game controller. When a user moves the game controller, the motion sensor detects, for example, the inclination and the rotation of the game controller, and by transmitting the detected value to a game device, game operation data different from the conventional user's button manipulation data can be generated. For example, in a racing game, by treating a game controller as if it were a steering wheel of the car, a user can play a game with more realistic feeling compared to the feeling while operating with buttons.

However, when a vibrator and a motion sensor are mounted on a game controller, the motion sensor detects not only the motion element of the game controller given by the movement of a user, but also the motion element of the game controller attributed to the vibrating motion of the vibrator. For this reason, the game operation data not representing the game operation the user have originally intended may be reflected in the behavior of a game character, making the user to feel odd.

SUMMARY OF THE INVENTION

A general purpose of the present invention is to provide a technique which easily remove the motion element of the game controller which is attributed to the vibrating motion of the vibrator from the output data of a motion sensor such as an acceleration sensor and an angular velocity sensor or reduce the motion element.

A game controller according to the embodiment of the present invention is operative to transmit game operation data to a game device and comprises: a motion sensor operative to detect the movement of the game controller; a low pass filter installed at the output of the motion sensor; and at least one vibrator. The cutoff frequency of the low pass filter is set lower than the natural frequency (natural vibration frequency) of the game controller. It is conceivable that the game controller can have a plurality of peak values of the natural frequencies. In that case, the cutoff frequency of the low pass filter is preferably set lower than the lowest peak value of the natural frequency.

Optional combinations of the aforementioned constituting elements, and implementations of the invention in the form of methods, apparatuses, systems, recording mediums and computer programs may also be practiced as additional modes of the present invention. A technique which easily remove the motion element of the game controller which is attributed to the vibrating motion of the vibrator from the output data of a motion sensor or reduce the motion element can be achieved by the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

Figure 1:
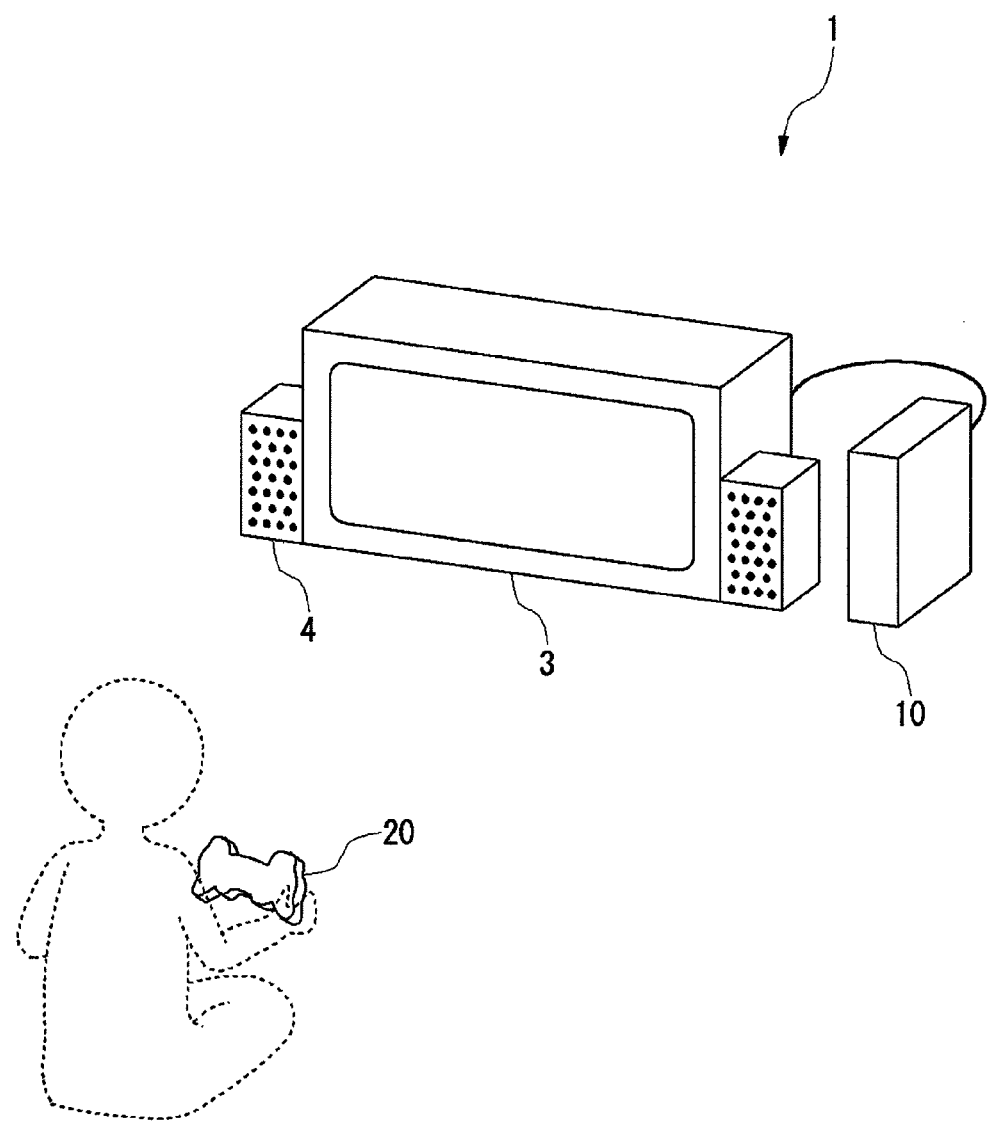
FIG. 1 is a diagram showing the usage environment of a game system according to the embodiment of the present invention.

FIG. 1 shows the usage environment of a game system according to the embodiment of the present invention. A game system 1 is provided with an image display device 3, an audio output device 4, a game device 10, and a controller 20. The image display device 3, the audio output device 4, and the controller 20 are connected to the game device 10.

The image display device 3 is a display to process an image signal. The image display device 3 displays a game screen upon the reception of the image signal generated in the game device 10. The audio output device 4 is a speaker to output audio. The audio output device 4 outputs game audio upon the reception of the audio signal generated in the game device 10. The image display device 3 and the audio output device 4 constitute an output device in the game system 1. The game device 10 and the output device may be connected via wires such as an AV cable or may be connected wirelessly. A home network built with, for example, a network (LAN) cable or a wireless LAN, may be established between the game device 10 and the output device.

The controller 20 is an input device for a user to input game operation data to move a character in the game, and the game device 10 is a processing device which processes a game application based on the game operation data provided by the controller 20 and creates the image signal and audio signal indicating the processing result of the game application. The technique shown in the embodiment can be realized not only in game applications but in an entertainment system provided with a processing device to execute other kinds of applications. The game system 1 in which a game application is executed will be explained as follows as a representation of entertainment systems.

The controller 20 has a function of transmitting the game operation data input by the user to the game device 10, and in the embodiment, the controller 20 is provided as a wireless controller which communicates wirelessly with the game device 10. The controller 20 and the game device 10 may establish a wireless connection by using Bluetooth (registered trademark) protocol. In transmitting and receiving the game operation data, the game device 10 functions as a base unit, in other words, a master, and the controller 20 functions as a slave unit, in other words, a slave. The controller 20 is not limited to a wireless controller and may be a wired controller which is connected to the game device 10 via a cable.

The controller 20 is activated by a battery which is not shown, and is provided with a plurality of buttons and keys for user manipulation to progress the game. When the user manipulates the button or the key of the controller 20, the manipulation data is periodically transmitted to the game device 10 as the game operation data wirelessly. The controller 20 is provided with a three axis acceleration sensor which detects acceleration in three axes, and an angular velocity sensor which detects angular velocity around a predetermined axis. The three axis acceleration sensor and the angular velocity sensor constitute the motion sensor which detects the movement of the controller 20. In some game applications, detection value of each sensor is treated as the game operation data and transmitted periodically to the game device 10 wirelessly. For example, by moving the controller 20 as if it were a steering wheel of a car, the output data of the three axis acceleration sensor and the angular velocity sensor are used as game operation data in a racing game where cars are moved in the game.

The game device 10 receives the game operation data on the game application from the controller 20, controls the game progress in accordance with the game operation data, and generates the game image signal and the game audio signal. The generated game image signal and the game audio signal are output by the image display device 3 and the audio output device 4, respectively. The game device 10 has a function of transmitting to the controller 20 the vibration control signal to vibrate the controller 20 in accordance with the progress status of the game application. The controller 20 has the vibrator, and upon the reception of a vibration starting signal, the controller 20 starts driving the vibrator; and upon the reception of a vibration terminating signal, the controller 20 terminates driving the vibrator. The game device 10 may transmit for every transmission frame a vibration controlling signal indicating whether to drive the vibrator; and in that case, the vibration of the controller 20 is controlled in accordance with the vibration controlling signal.

Figure 2:
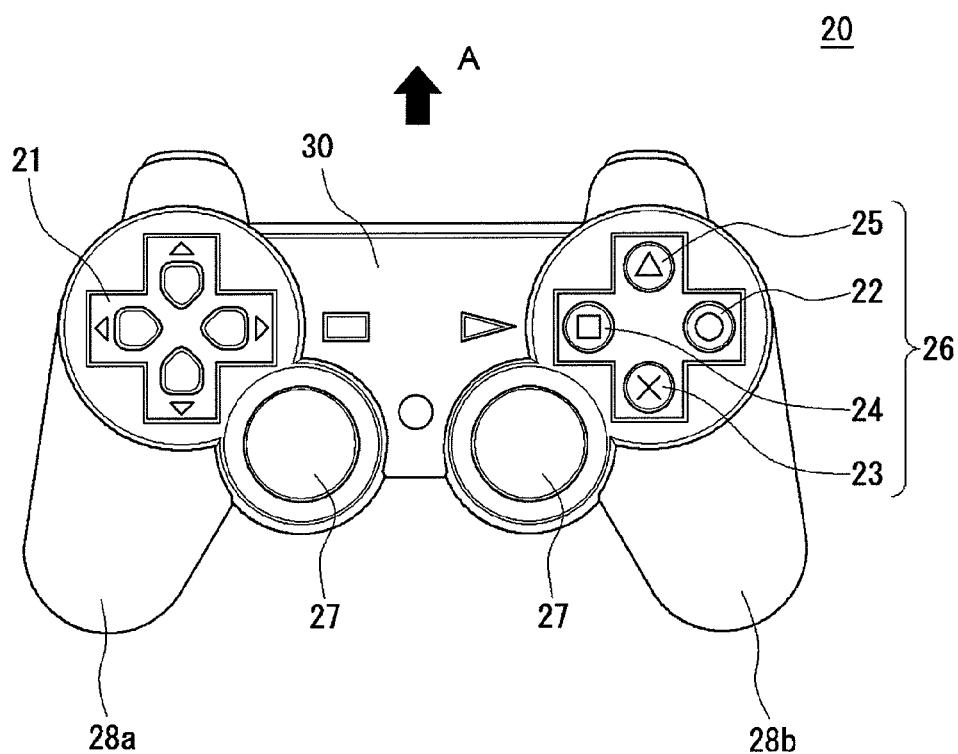
FIG. 2 is a diagram showing the exterior configuration of a controller.

FIG. 2 shows the exterior configuration of a controller. The controller 20 is provided with a direction key 21, an analog stick 27, and four different manipulation buttons 26. The four different buttons 22-25 are marked with different figures in different colors so as to distinguish one button from another. More specifically, a ○ button 22 is marked with a red circle, a x button 23 with a blue cross, a □ button 24 with a purple square, and a Δ button 25 with a green triangle.

The user grips a left grip part 28a with his or her left hand, a right grip part 28b with his or her right hand, and manipulates the controller 20. The direction key 21, the analog stick 27, and the manipulation buttons 26 are provided on a top housing 30 so that the user can manipulate them while gripping the left grip part 28a and the right grip part 28b.

The vibrators provided with, for example, motors, are placed inside of the housings of the left grip part 28a and the right grip part 28b. When a wireless communication module of the controller 20 receives the vibration starting signal from the game device 10, the right and left vibrators are driven. The vibrating motion is then transmitted the housing of the controller 20, and the controller 20 vibrates. Also a substrate for controlling the function of the controller 20 is placed near the center of the interior of the housing of the controller 20. For example, the previously mentioned three axis acceleration sensor and the angular velocity sensor are installed on the substrate. The housing which constitutes the outer frame of the controller 20 is constituted by fitting a bottom housing and a top housing to each other, and a vibrator and a substrate are fixed to the bottom housing.

The three axis acceleration sensor and the angular velocity sensor on the substrate detect the movement of the controller 20, and when the vibrator is driven, the vibration component of the controller 20 generated by driving the vibrator is included in the detection value. If the above mentioned racing game has a game setting in which a car runs straight by maintaining the controller 20 in a horizontal position, it is conceivable that the car which should run straight runs in zigzags due to the vibration component when the vibrator is driven. Since such behavior of the car gives the user unpleasant feeling, the vibration component from the vibrator is preferably removed to a maximum extent from the game operation data. The mechanism of reflecting the position and the movement of the controller 20 affected by the movement of the user in a character in the game the user is playing will be explained as precisely as possible as follows.

Figure 3:
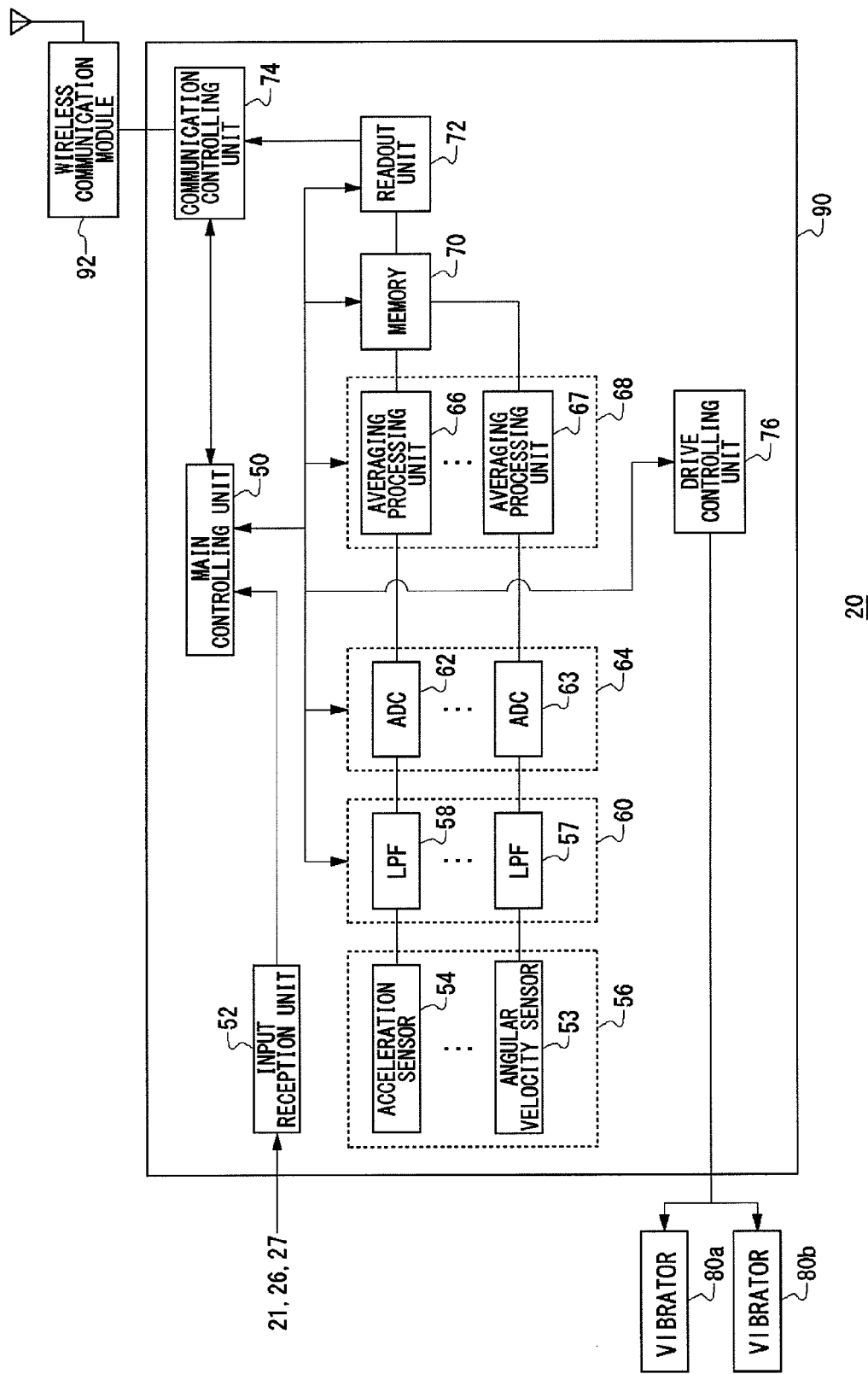
FIG. 3 is a diagram showing the internal configuration of a controller.

FIG. 3 shows the internal configuration of a controller. The controller 20 has a processing unit 90 and is further provided with vibrators 80a and 80b which are provided with motors and eccentric members, and a wireless communication module 92. The vibrators 80a and 80b are placed in the left grip part 28a and right grip part 28b, respectively in the inside of housing of the controller 20. The wireless communication module 92 has a function of transmitting and receiving data to and from the wireless communication module of the game device 10. The processing unit 90 performs the desired process in the controller 20. The functions of the processing unit 90 and the wireless communication module 92 may be realized as a circuit built in a substrate provided inside of the housing.

The processing unit 90 is provided with a main controlling unit 50, an input reception unit 52, a sensor block 56, a filter block 60, an analog-to-digital conversion device 64, an averaging processing block 68, a memory 70, a readout unit 72, a communication controlling unit 74, and a drive controlling unit 76. The communication controlling unit 74 transmits and receives necessary data to and from the wireless communication module 92.

The input reception unit 52 receives the manipulation data from an input unit, for example, the direction key 21, the manipulation button 26, and the analog stick 27, and transmits the manipulation data to the main controlling unit 50. The main controlling unit 50 provides the received manipulation data to the memory 70 and stores the manipulation data in the memory 70. The manipulation data from various input units are overwritten in the respective area assigned for each manipulation data as game operation data in the memory 70.

The communication controlling unit 74 controls the transmission process of the wireless communication module 92 at predetermined cycles. Since the frame cycle of a game image of the game device 10 is set at 1/60 s, the transmission cycle of the wireless communication module 92 is set at less than 1/60 s, for example, 11.25 ms. The readout unit 72 reads out game operation data from the memory 70 in accordance with the transmission cycle of the wireless communication module 92, and provides the game operation data to the communication controlling unit 74. Since the manipulation data from the various input units are overwritten and saved in the respective storage areas, the readout unit 72 can provide the manipulation data as the latest game operation data to the communication controlling unit 74.

The sensor block 56 has a plurality of acceleration sensors 54 and angular velocity sensors 53. When the sensor block 56 includes three axis acceleration sensor, the sensor block 56 is provided with three acceleration sensors 54. The acceleration sensor 54 and the angular velocity sensor 53 detect the movement of the controller 20 caused by the movement of the user. The detection values, which are output data, of the acceleration sensor 54 and the angular velocity sensor 53 are used as the game operation data of a game application in the embodiment.

The filter block 60 has a plurality of low pass filters (LPF) 58 and 57. LPF 58 is installed at the downstream of acceleration sensor 54, and is a filter which passes the frequency component below the cutoff frequency of the output data of acceleration sensor 54, and attenuates a frequency component close to or above the cutoff frequency. The LPF 57 is installed at the downstream of the angular velocity sensor 53, and is a filter which passes the frequency component below the cutoff frequency of the output data of the angular velocity sensor 53, and attenuates a frequency component close to or above the cutoff frequency. LPF 58 and LPF 57 may be constituted as passive filters and to have the same cutoff frequencies. Compared with an active filter, the passive filter does not require electricity for the filter operation; and thus, the passive filter is suitable for use in the battery driven controller 20.

Although not shown in the figure, an additional passive filter may be installed between the acceleration sensor 54 and LPF 58. The passive filter may be formed inside of the acceleration sensor 54, or may be formed by the internal resistor of the acceleration sensor 54 and the condenser installed outside of the acceleration sensor 54. Also, the passive filter may be formed outside of the acceleration sensor 54 so as to become in series with LPF 58. The cutoff frequency of the passive filter is set higher than the cutoff frequency of LPF 58.

Similarly not shown in the figure, an additional active filter may be installed between the angular velocity sensor 53 and LPF 57. The active filter has an amplifying component, for example, an OP amp and a transistor, and has a function of amplifying the output data of the angular velocity sensor 53 and providing the amplified output data to LPF 57. Since the output data of the angular velocity sensor 53 is smaller when compared with the output data of the acceleration sensor 54, by amplifying with the active filter, the output data can be used preferably as the game operation data. The cutoff frequency of the active filter is set higher than the cutoff frequency of LPF 57.

The analog-to-digital conversion device 64 is provided with a plurality of analog-to-digital converters (ADC) 62 and 63. ADC 62 converts an analog signal output from the LPF 58 into a digital signal. The ADC 63 converts an analog signal output from the LPF 57 into a digital signal. Preferably, a sampling cycle is set smaller than the transmission cycle of the wireless communication module 92. The sampling cycle may be, for example, about 2 ms. The analog-to-digital conversion device 64 may retain a fixed sampling cycle or allow the sampling cycle to be controlled as desired by the main controlling unit 50.

The averaging processing block 68 is provided with a plurality of averaging processing units 66 and 67. The averaging processing unit 66 performs the averaging process on sampling values output from ADC 62 during the transmission cycle of the wireless communication module 92, and overwrites the averaged value as game operation data in the area assigned in the memory 70. The averaging processing unit 67 performs the averaging process on sampling values output from the ADC 63 during the transmission cycle of the wireless communication module 92, and overwrites the averaged value as game operation data in the area assigned in the memory 70. As described above, the averaging processing units 66 and 67 can reduce the influence of the vibration component of the housing attributed to the vibrator 80 superimposed on the sensor output data by averaging the sampling values during the transmission cycle. The averaging processing units 66 and 67 do not need to exist in the processing unit 90, and in that case, the sampling values of ADCs 62 and 63 are overwritten and stored as game operation data in the respective areas in the memory 70 at a sampling cycle.

As stated previously, the readout unit 72 reads out the game operation data from the memory 70 in accordance with the transmission time specified by the transmission cycle of the wireless communication module 92, and provides the game operation data to the communication controlling unit 74. Since the sensor output data provided by the averaging processing units 66 and 67 and the ADCs 62 and 63 are overwritten and saved in the respective storage areas, the readout unit 72 can provide the latest sensor output data, which is included in the game operation data, to the communication controlling unit 74. The communication controlling unit 74 transmits, via the wireless communication module 92 and to the game device 10, the sensor output data as the game operation data which is acquired by the motion sensor, more specifically, the acceleration sensor 54 and the angular velocity sensor 53, along with the manipulation data of, for example, the manipulation button 26 which is received by the input reception unit 52.

Upon the reception of a vibration controlling signal indicating the start or termination of the vibration from the game device 10, the wireless communication module 92 provides the vibration controlling signal to the main controlling unit 50. The main controlling unit 50 provides the vibration controlling signal to the drive controlling unit 76, and the drive controlling unit 76 controls the drive of the vibrators 80*a* and 80*b* based on the vibration controlling signal. The drive controlling unit 76 may be provided as a switch for driving the vibrators 80*a* and 80*b*, or as a PWM controlling unit for varying a duty ratio of a supply voltage.

Figure 4:
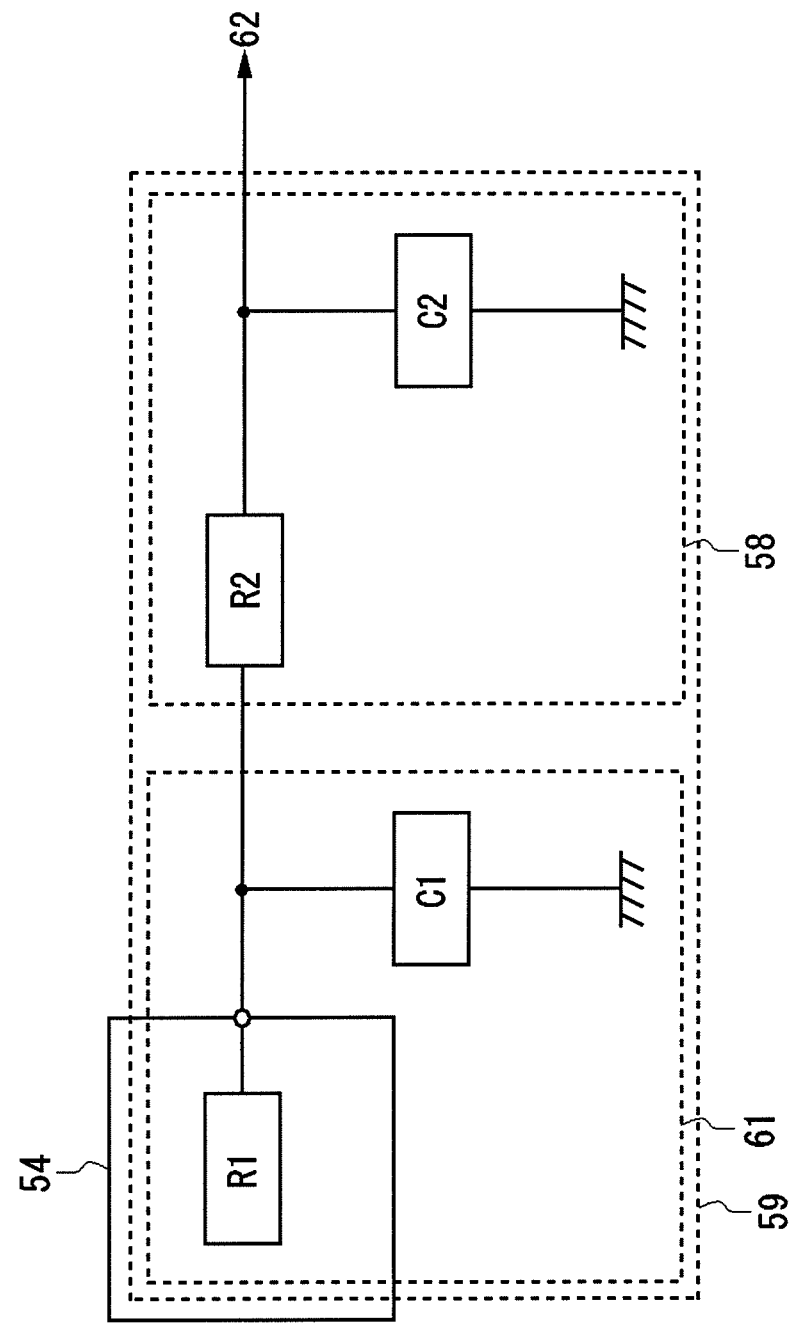
FIG. 4 is a diagram showing the configuration of a low pass filter installed at the output of an acceleration sensor.

FIG. 4 shows the configuration of a low pass filter installed at the output of the acceleration sensor. The output data of the acceleration sensor 54 passes through a two-stage structured second-order passive filter 59 provided with LPF 61 and LPF 58 and is filter processed by the second-order passive filter 59. The second-order passive filter 59 constitutes a two-stage low pass filter. The cutoff frequency of the second-order passive filter 59 is set as the smaller of the cutoff frequency of LPF 61 and the cutoff frequency of LPF 58. As shown in FIG. 3, LPF 58 is positioned at the downstream of the output of the acceleration sensor 54, and LPF 61 is positioned between the acceleration sensor 54 and LPF 58. In the example of FIG. 4, LPF 61 is provided with an internal resistor R1 in the acceleration sensor 54 and a capacitor C1. LPF 58 is provided with a resistor R2 and a capacitor C2. Although the order of the filter is not limited to the second order, the second order is preferred in the controller 20 as will herein after be described in detail.

The controller 20 in the embodiment has the vibrator 80 which vibrates, along with the acceleration sensor 54 and the angular velocity sensor 53. In the motion sensor such as the acceleration sensor 54, it is desirable that the movement of the controller 20 caused by movement of the user is accurately detected, and it is not desirable that the motion sensor detects the vibration component given to the housing due to the vibrating motion of the vibrator 80. Usually, there is a limit to the speed at which the user moves the controller 20. Therefore, by setting the cutoff frequency of the second-order passive filter 59 to a maximum frequency, which is considered to be a maximum frequency at which the user can move the controller 20, or less, the vibration component of the controller 20 attributed to the vibrating motion of the vibrator 80 can be removed from the output data of the acceleration sensor 54, while the acceleration sensor 54 can detect the movement of the controller 20 caused by the movement of the user.

As for the vibration component which affects the detected value by the motion sensor such as the acceleration sensor 54, the resonance element attributed to the vibrating motion of the vibrator 80 is far larger than the vibration component of the vibrator 80. Preferably, in the game device 10 in the embodiment, the peak value of the natural frequency of the controller 20 is set high by tightly fixing the member in the housing to the housing. In this case, the cutoff frequency of LPF 58 can be set lower than the peak value of the natural frequency of the controller 20, at least a part of the resonance element can be removed in the second-order passive filter 59. In this case, by setting the cutoff frequency of LPF 58 to two thirds or less of the peak value of the natural frequency of the controller 20, the majority of resonance elements can be removed.

Figure 5:
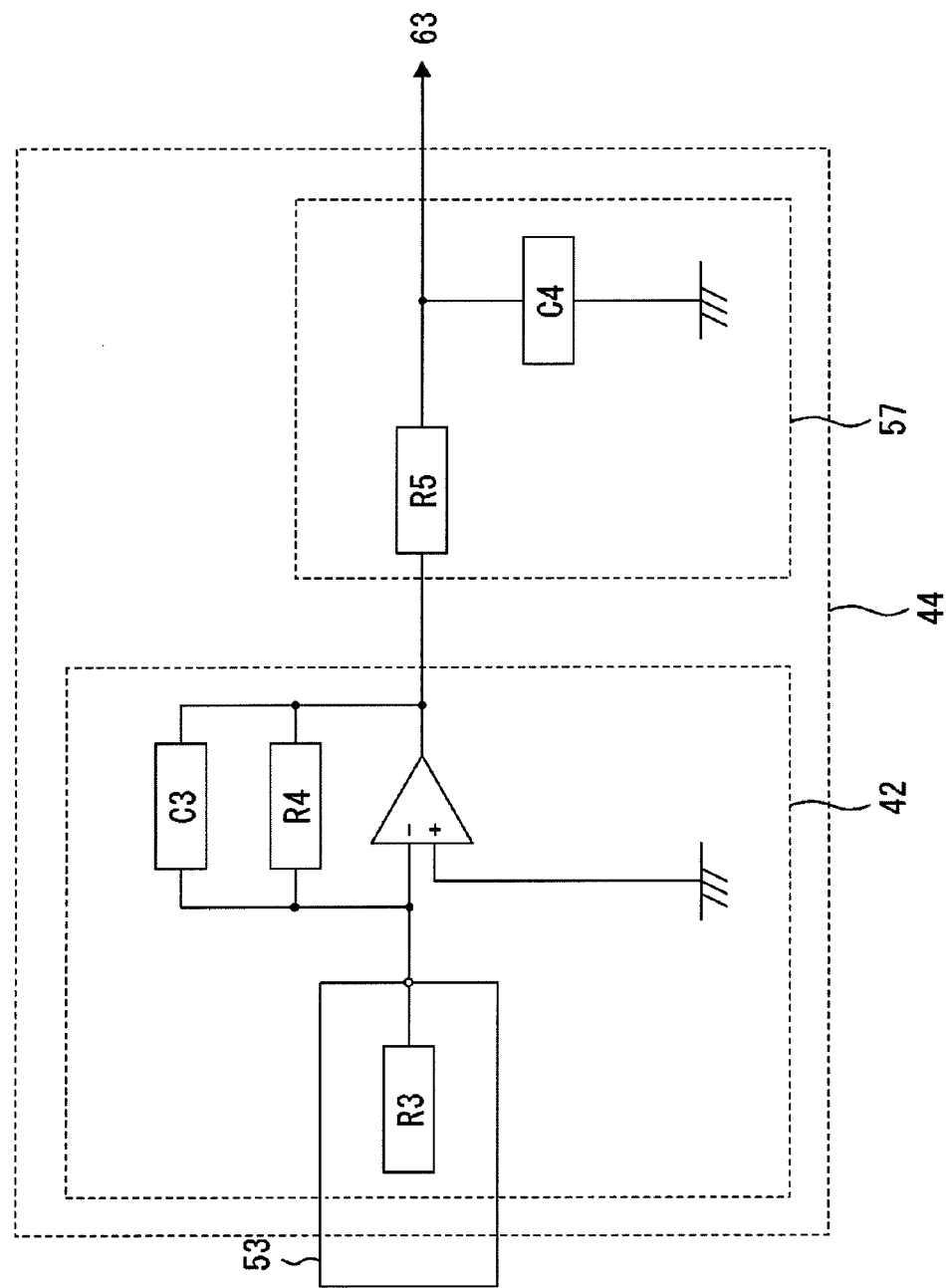
FIG. 5 is a diagram showing the configuration of a low pass filter installed at the output of an angular velocity sensor.

FIG. 5 shows the configuration of a low pass filter installed at the output of the angular velocity sensor. The output data of the angular velocity sensor 53 passes through a two-stage structured second-order low pass filter 44 provided with LPF 42 and LPF 57 and is filter processed by the second-order low pass filter 44. The cutoff frequency of the second-order low pass filter 44 is set as the smaller of the cutoff frequency of LPF 42 and the cutoff frequency of LPF 57. As shown in FIG. 3, LPF 57 is positioned at the downstream of the output of the angular velocity sensor 53, and LPF 42 is positioned between the angular velocity sensor 53 and LPF 57. As stated previously, LPF 42 is constituted as an active filter in order to amplify the output data of the angular velocity sensor 53. In the example of FIG. 5, LPF 42 is provided with an internal resistor R3 in the angular velocity sensor 53, an OP amp, a resistor R4, and a capacitor C3. LPF 57 is provided with a resistor R5 and a capacitor C4.

As explained in relation to FIG. 4, there is a limit to the speed at which the user moves the controller 20. Therefore, by setting the cutoff frequency of the two-stage low pass filter 44 to the maximum frequency at which a person can move the controller 20 or less, the angular velocity sensor 53 can detect the movement of the controller 20 caused by the movement of the user, and the vibration component of the controller 20 attributed to the vibrating motion of the vibrator 80 can be removed from the output data of the angular velocity sensor 53. In the game device 10 in the embodiment, by tightly fixing the member in the housing to the housing, the cutoff frequency of LPF 57 can be set lower than the peak value of the natural frequency of the controller 20, and at least a part of the resonance element can be removed in the two-stage low pass filter 44. In this case, by setting the cutoff frequency of LPF 57 to two thirds or less of the peak value of the natural frequency of the controller 20, the majority of resonance elements can be removed.

Figure 6A:
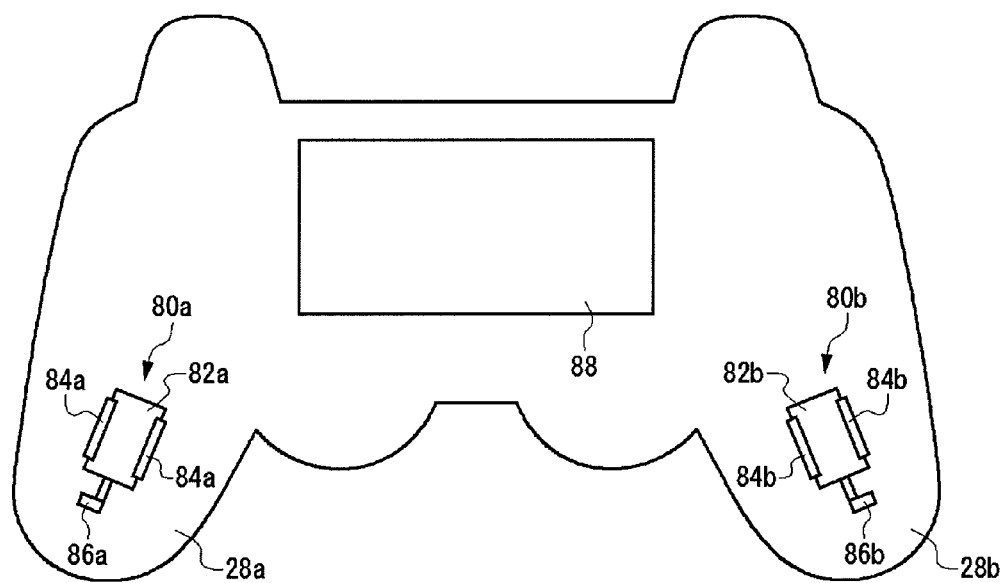
FIG. 6A is a diagram showing substrates and vibrators being exposed which are fixed to a bottom housing.

FIG. 6A shows the substrate and the vibrator which are fixed in the bottom housing being exposed after the removal of the top housing of the controller. A substrate 88 has a horizontally oriented shape, and is fixed to a front central position of the bottom housing. The vibrator 80*a* is provided with a motor 82*a* and an eccentric member 86*a* attached at the end of the motor shaft, and is fixed to a position in the left grip part 28*a* of the bottom housing while being sandwiched by a pair of binding lugs 84*a*. Similarly, the vibrator 80*b* is provided with a motor 82*b* and an eccentric member 86*b*, and is fixed to a position in the right grip part 28*b* of the bottom housing while being sandwiched by a pair of binding lugs 84*b*. The eccentric member 86 has a semicircular shape and is eccentrically fixed to the motor shaft, and when the motor shaft rotates, the eccentric member 86 vibrates the housing.

Figure 6B:
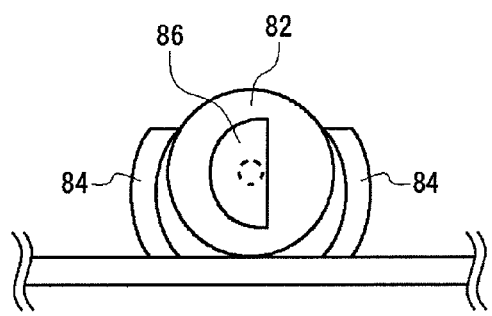
FIG. 6B is a diagram showing a fixed structure of a motor.

FIG. 6B shows the fixed structure of a motor. A pair of binding lugs extends from the bottom housing, and the motor 82 is pushed between the pair of binding lugs 84. While the motor 82 is pushed in, the pair of binding lugs 84 has elasticity for pushing the motor 82 in the direction in which the pair of binding lugs becomes closer to each other, and the motor 82 is tightly fixed to the bottom housing by the elastic force. The substrate 88 is also tightly fixed to the bottom housing in order to raise the natural frequency.

Figure 7:
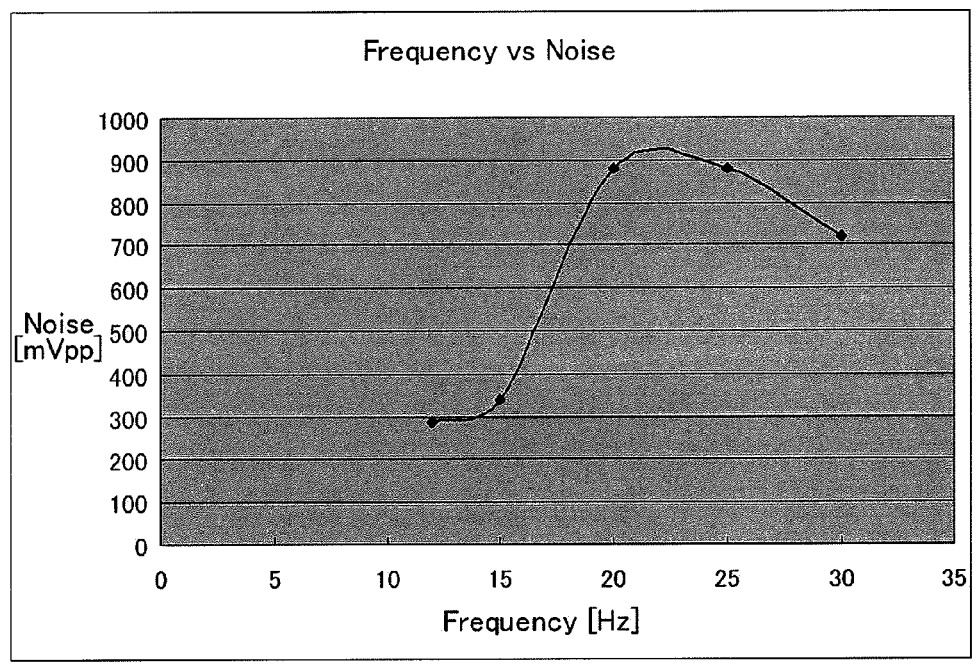
FIG. 7 is a diagram showing the result of an experiment in which the relation is acquired of the vibration frequency of a controller and the noise level detected by an acceleration sensor.

FIG. 7 shows the result of the experiment in which the relation is acquired of the vibration frequency of the controller and the noise level detected by the acceleration sensor. The output data of the acceleration sensor 54 is a detected value without filtering with the filters, such as LPF 61 or LPF 58, in other words, the detected value for the acceleration sensor 54 is shown. According to the experimental result, the tendency is found in which the noise detected by the acceleration sensor 54 increases considerably when the vibrating frequency applied to the controller 20 is between 15 Hz and 20 Hz. Also, as shown in the figure, the peak value of the natural frequency (natural vibration frequency) of the controller 20 is approximately 22 Hz. Accordingly, the inventor found from the experimental result that in order to effectively remove the vibration component applied to the housing of the controller 20, it is preferable the cutoff frequency of LPF 58 is set to 15 Hz or less.

In general, the frequency of vibration given to the controller 20 by the movement of the user is lower than the frequency given to the controller 20 by the vibrator 80. As stated previously, there is a limit to the speed at which a person can move the controller 20, and it is conceivable that the frequency of vibration given to the controller 20 does not usually exceed 15 Hz. Therefore, if the cutoff frequency of LPF 58 is set to a predetermined value of 15 Hz or less, for example to 15 Hz, LPF 58 can suitably output the vibration component attributed to the movement of the user and the vibration component attributed to the vibrating motion of the vibrator 80 can be removed effectively.

On the other hand, when the cutoff frequency of LPF 58 is lowered to a maximum extent within the range where the movement of the controller 20 caused by the movement of the user can be detected (e.g., about 5 Hz), the vibrating motion attributed to the vibrator 80 can be effectively removed; on the other hand, the lag time in LPF 58 becomes longer due to the effect of a time constant. In the game system 1, the game operation data of the user is preferably reflected in the movement of the character in the game the user is playing instantaneously, and the lag time in LPF 58 is preferably reduced to a maximum extent. More specifically, the lag time is preferably set shorter than the transmission cycle of the wireless communication module 92. In this case, by installing LPF 58, the lag longer than two transmission cycles is not generated in the transmission of the sensor output data, and the maximum lag is one transmission cycle.

For example, the resistance of the resistor R2 is set to 33 kΩ, and the capacitance of the capacitor C2 is set to 0.33 μF. As described above, by setting the resistance and the capacitance, the cutoff frequency of a CR filter becomes about 15 Hz. In this case, the lag time due to the time constant is about 10.89 ms. As stated previously, when the transmission cycle of the wireless communication module 92 is set to 11.25 ms in the embodiment and the cutoff frequency is set to 15 Hz, the lag time of the LPF 58 becomes shorter than the transmission cycle of the wireless communication module 92. As a result, even if LPF 58 is installed, the maximum transmission lag time for the sensor output data can be kept to one transmission cycle of the wireless communication module 92.

Referring to FIG. 4, LPF 61 placed in the former stage of LPF 58 may have the same structure as the structure of LPF 58 so as to have the cutoff frequency of 15 Hz. In this case, the maximum transmission lag time caused by the second-order passive filter 59 can be kept to two transmission cycles of the wireless communication module 92. Thus, the lag time which is acceptable in the game in which the real time performance is required can be realized.

Described above is the explanation on the LPF 58 installed at the output of the acceleration sensor 54. For the same reason, the appropriate cutoff frequency, which allows for the lag time due to the time constant, is also set for the LPF 57 installed at the output of the angular velocity sensor 53.

Referring to FIG. 5, LPF 57 may have the same structure as the structure of LPF 58 which has the cutoff frequency of 15 Hz. More specifically, the resistance of the resistor R5 can be set to 33 kΩ, and the capacitance of the capacitor C4 can be set to 0.33 μF. Also, as for LPF 42 placed in the former stage of LPF 57, the resistance and the capacitance may be set to have the cutoff frequency of about 1 kHz. In this case, the maximum lag time caused by the second-order low pass filter 44 can be kept to two transmission cycles of the wireless communication module 92. Thus, the lag time which is acceptable in the game in which the real time performance is required can be realized.

Figure 8A:
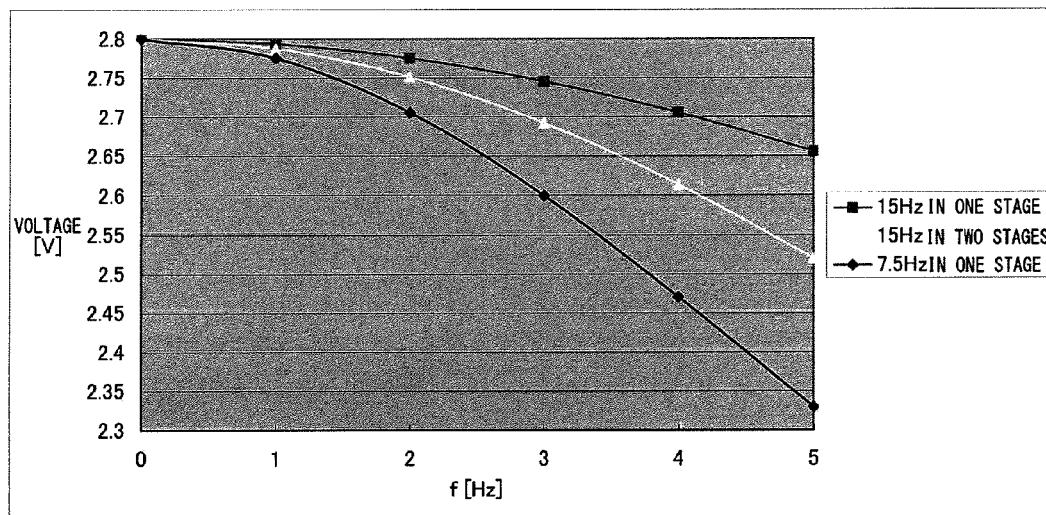
FIGS. 8A and 8B are diagrams showing the simulation result for LPF installed at the downstream of an acceleration sensor.
Figure 8B:
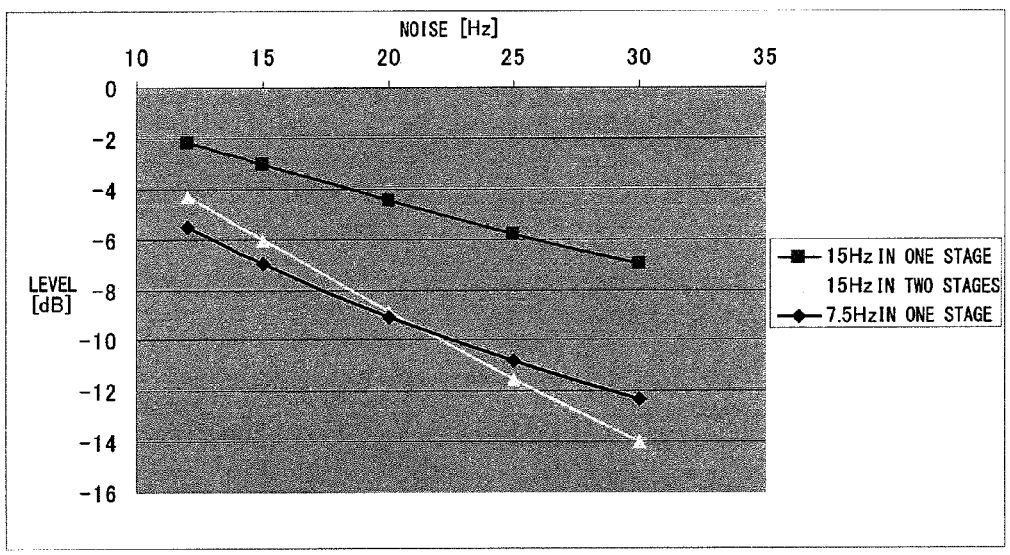

FIGS. 8A and 8B show the simulation result for LPF placed at the downstream of the acceleration sensor. In the simulation, the voltage level in the movable frequency band and the frequency characteristics in the noise frequency band are examined in the situations where the one or two LPFs are placed at the downstream of the acceleration sensor 54 as follows:

1) One LPF having 15 Hz cutoff frequency is installed.
2) Two LPFs having 15 Hz cutoff frequencies are installed in series.
3) One LPF having 7.5 Hz cutoff frequency is installed.

FIG. 8A shows the voltage level in the movable frequency band. The simulation result revealed that the attenuation element of the sensor output data is considerably large in the situation where one LPF having 7.5 Hz cutoff frequency is installed.

FIG. 8B shows the frequency characteristics in the noise frequency band. The simulation result revealed that the noise frequency component cannot be suitably removed in the situation where one LPF having 15 Hz cutoff frequency is installed. In FIG. 8B, although the range from 10 Hz to 35 Hz is shown as the noise frequency band, the frequency of 15 Hz or higher is considered as the noise component in the environment in the embodiment.

According to the simulation result described above, by installing the second-order passive filter 59 provided with two LPFs, LPF 61 and LPF 58, at the downstream of the acceleration sensor 54, the second-order passive filter 59 can output the movement of the user suitably, and the vibration component attributed to the vibrating motion of the vibrator 80 can be suitably removed from the sensor output data. For the reason stated above, LPF 61 and LPF 58 having the cutoff frequency of 15 Hz are installed in two stages at the downstream of the acceleration sensor 54 in the embodiment.

Figure 9:
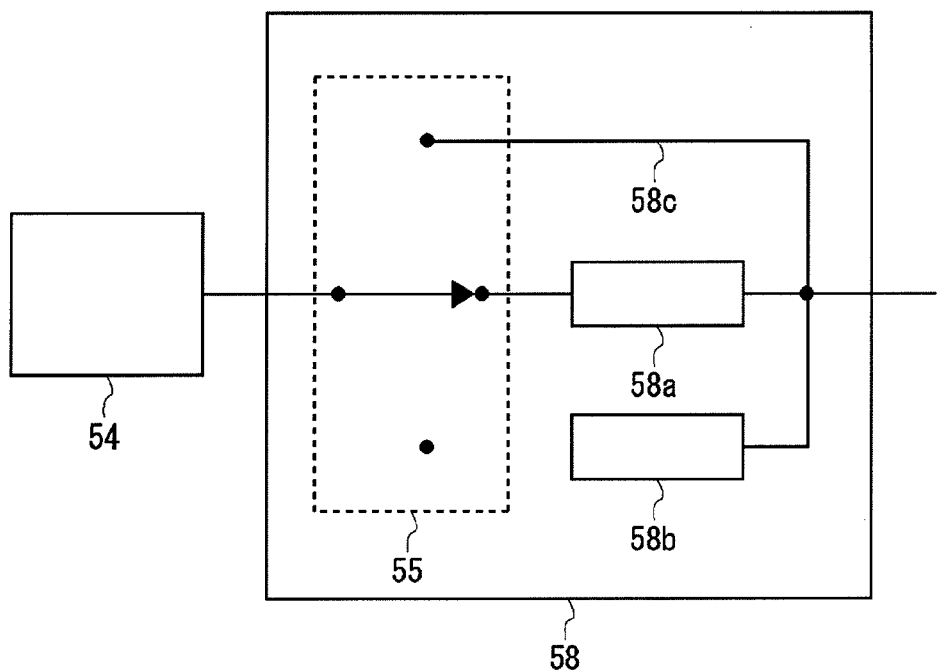
FIG. 9 is a diagram showing a variation example of LPF.

FIG. 9 shows a variation example of LPF. The LPF 58 is provided so that filter circuits 58a or 58b which have different cutoff frequencies can be used selectively by a switch 55. Although LPF 61 shown in FIG. 4 is installed between the acceleration sensor 54 and LPF 58, the schematic illustration is omitted. In LPF 58 shown in FIG. 9, the filter circuit 58a may, for example, have a cutoff frequency of 10 Hz, and the filter circuit 58b may have a cutoff frequency of 15 Hz. A bypassing route 58c which bypasses filter circuits can also be selected with the switch 55.

As stated above, since the lag is caused by the time constant in the filter circuit, the sensor output is preferably unconnected to the filter circuit from the lag time perspective in the game application where the immediate reflection of the game operation data of the user in the movement of the character in the game is required. In the game application where there is no vibrating motion of the vibrator 80, the main controlling unit 50 controls the switch 55 so as to connect the acceleration sensor 54 and the bypassing route 58c. In contrast, in the game application where vibrating motion of the vibrator 80 is generated, the main controlling unit 50 determines the destination for the acceleration sensor 54 according to whether the game application requires low latency. More specifically, in the game application where low latency is required, the main controlling unit 50 controls the switch 55 so as to connect the acceleration sensor 54 and the filter circuit 58b; and in the game application where low latency is not required, the main controlling unit 50 controls the switch 55 so as to connect the acceleration sensor 54 and the filter circuit 58a. Thus, by controlling the switch 55 with the main controlling unit 50 in accordance with the presence of vibrating motion generated and further of requirement for the low latency, the appropriate game operation data in accordance with the game application can be sent to the game device 10.

The information indicating whether the vibrating motion is generated and whether the low latency is required in the game application may be sent beforehand to the controller 20 from the game device 10. When the information indicating whether the vibrating motion is generated and/or whether the low latency is required is embedded in the game program, the game device 10 may read the information out and notify the controller 20 of the information beforehand. The main controlling unit 50 sets the connection destination of the switch 55 based on the notified information.

The driving of the vibrator 80 is controlled by the vibration controlling signal sent form the game device 10. Therefore, upon the reception of the vibration starting signal, the main controlling unit 50 may switch the switch 55 from the bypassing route 58c to the filter circuit 58a or filter circuit 58b, and upon the reception of the vibration terminating signal, the main controlling unit 50 may return the switch 55 back to the bypassing route 58c. As a result, since the vibration component attributed to the vibrating motion of the vibrator 80 is filter processed while the vibrating motion of the vibrator 80 is generated, and the output of the acceleration sensor 54 is connected to the bypassing route 58c while the vibrating motion of the vibrator 80 is not generated, the lag due to the filter processing can be avoided. Described above is the explanation on the LPF 58 installed at the downstream of the acceleration sensor 54. LPF 57 installed at the downstream of the angular velocity sensor 53 may have the same configuration.

Figure 10:
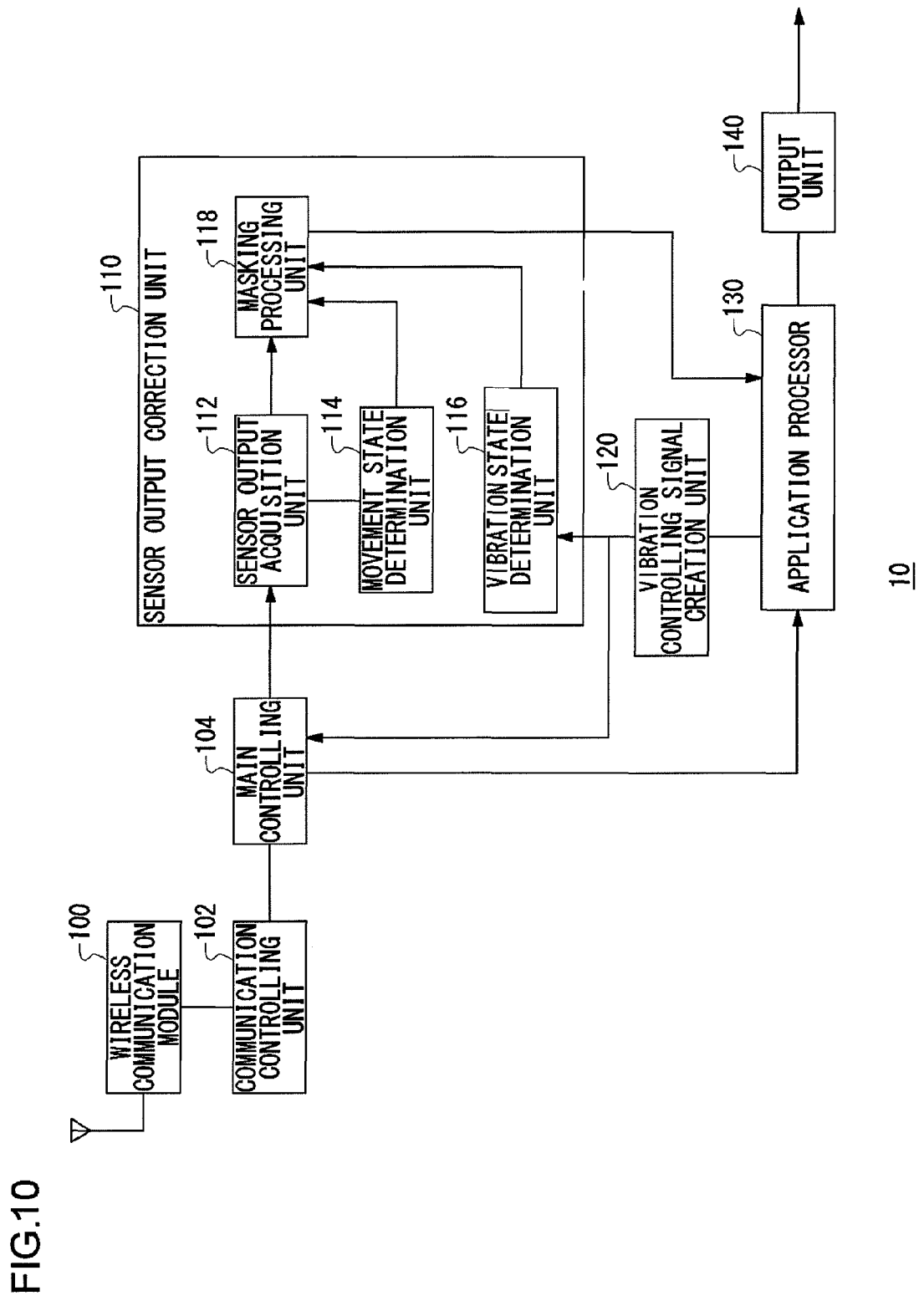
FIG. 10 is a diagram showing the configuration of a game device.

FIG. 10 shows the configuration of a game device. The game device 10 is provided with a wireless communication module 100, a communication controlling unit 102, a main controlling unit 104, a sensor output correction unit 110, a vibration controlling signal creation unit 120, an application processor 130, and an output unit 140. The processing functions according to the embodiment are implemented by any CPU, a memory or a program loaded into the memory. Configurations are implemented by the cooperation of hardware components. The program may be built in the game device 10 or may be provided from outside, being stored in the recording medium. Thus, a person skilled in the art should appreciate that there are many ways of accomplishing these functional blocks in various forms in accordance with the components of hardware only, software only, or the combination of both. In the illustrated example, the CPU of the game device 10 accomplishes the functions as the communication controlling unit 102, the main controlling unit 104, the sensor output correction unit 110, the vibration controlling signal creation unit 120, and the application processor 130. The game device 10 may have a plurality of CPU's, considering the configuration of the hardware. In this case, a CPU may function as the communication controlling unit 102 which controls the function of the wireless communication module 100, another CPU may function as the main controlling unit 104 which controls the function of the whole game device 10, another CPU may function as the application processor 130 and the vibration controlling signal creation unit 120, and another CPU may function as the sensor output correction unit 110.

The communication controlling unit 102 transmits and receives the required data to and from the wireless communication module 100, controls the communication process of the wireless communication module 100, and the wireless communication module 100 establishes the wireless communication with the wireless communication module 92 of the controller 20. The wireless communication module 100 and the wireless communication module 92 establish connections by, for example, a Bluetooth (registered trademark) protocol. The data such as the game operation data is sent at predetermined cycles from the wireless communication module 92 of the controller 20, and the communication controlling unit 102 provides the data received by the wireless communication module 100 to the main controlling unit 104.

The main controlling unit 104 provides the game operation data input through the input unit such as the direction key 21 to the application processor 130. The application processor 130 reflects the game operation data in the process of the game application.

The main controlling unit 104 provides the digitalized sensor output data to the sensor output correction unit 110. The game application started at the application processor 130 uses the sensor output data as game operation data, and the sensor output correction unit 110 corrects the sensor output data appropriately and provides the corrected sensor output data to the application processor 130 as game operation data. The application processor 130 reflects the sensor output data in the process of the game application.

Upon the reception of the sensor output data, a sensor output acquisition unit 112 provides the sensor output data to a masking processing unit 118. The sensor output acquisition unit 112 may perform the averaging process on the sensor output data provided from the controller 20 at predetermined cycles and then provide the averaged sensor output data to the masking processing unit 118. For example, the sensor output acquisition unit 112 performs the averaging process on the sensor output data of the predetermined number of cycles. As described above, the sensor output acquisition unit 112 can reduce the influence of the vibration component of the housing attributed to the vibrator 80 superimposed on the sensor output data by averaging the predetermined number of sensor output data provided in succession. The masking processing unit 118 performs the masking process on the acceleration sensor output data within the predetermined range of masking including zero acceleration. More specifically, the masking processing unit 118 corrects such acceleration sensor output data to have zero acceleration. There are a plurality of acceleration sensors 54 in the controller 20 and the same number of sensor output correction units 110 as the number of acceleration sensors 54 are provided. The masking processing unit 118 also performs the masking process on the angular velocity sensor output data within the predetermined range of masking including zero angular velocity. More specifically, the masking processing unit 118 corrects such angular velocity sensor output data to have zero angular velocity.

Figure 11A:
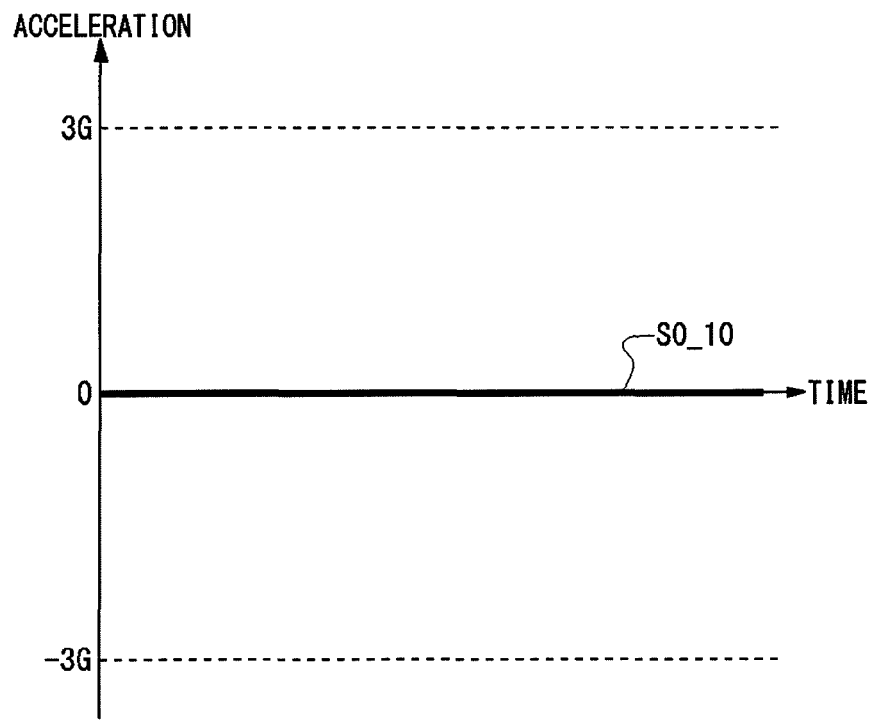
FIGS. 11A and 11B are diagrams showing sensor output data of the detected movement of a controller caused by the movement of a user.
Figure 11B:
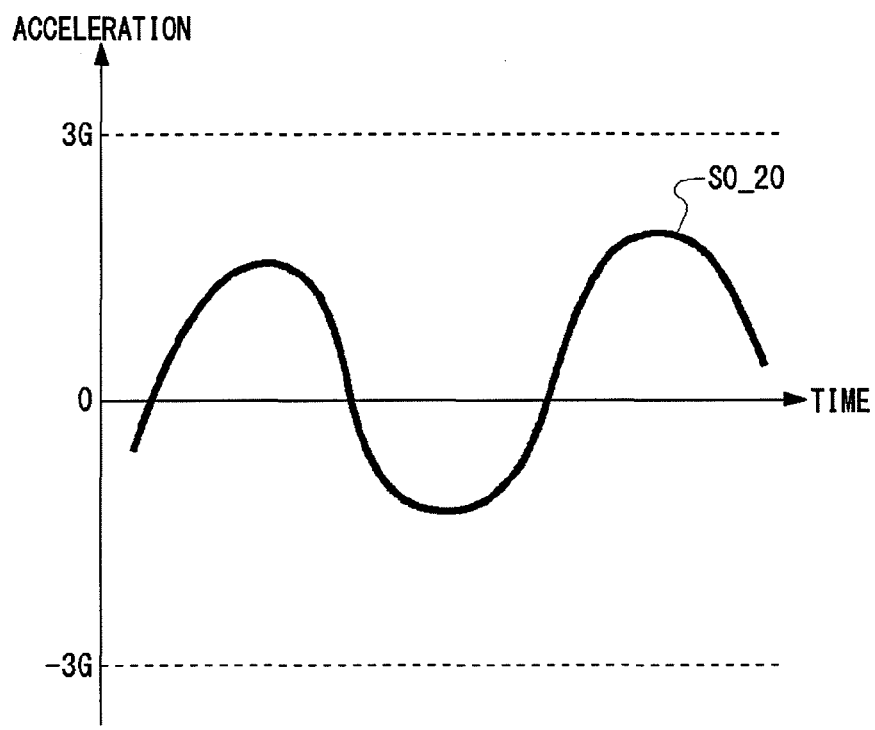

FIGS. 11A and 11B show the sensor output data of the detected motion of a controller caused by the movement of a user. For example, the sensor output data is the acceleration sensor output data of a z-axis element (vertical element). FIG. 11A shows a sensor output data SO_10 where the user grips the controller in a horizontal position without any vertical movements, and FIG. 11B shows a sensor output data SO_20 where the user grips the controller in a horizontal position and moves the controller up and down in a vertical direction.

Figure 12A:
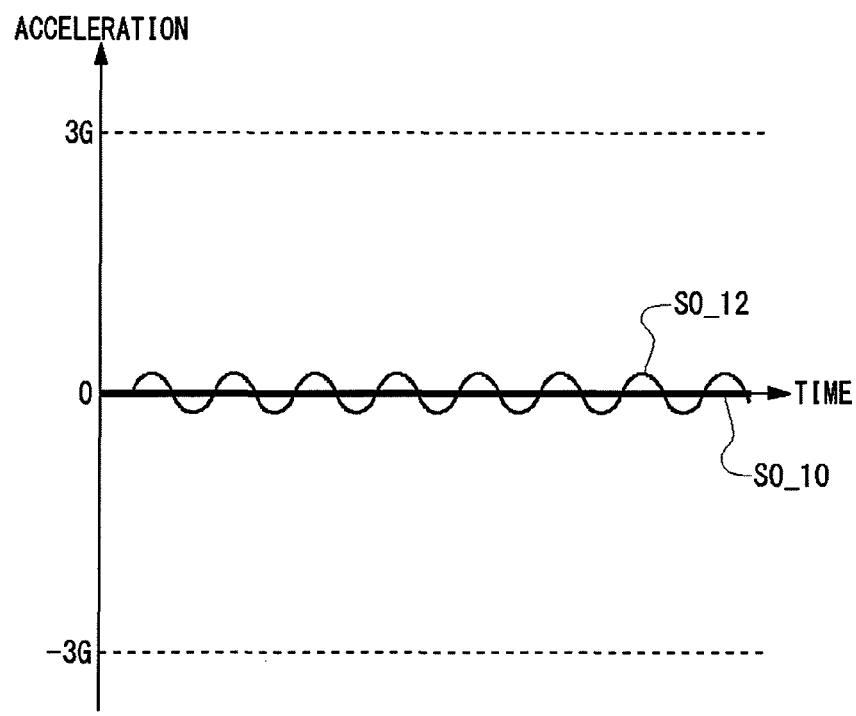
FIGS. 12A and 12B are diagrams showing sensor output data detecting vibrating motion of a controller caused by the vibrating motion of a vibrator, along with the movement of the controller caused by the movement of a user.
Figure 12B:
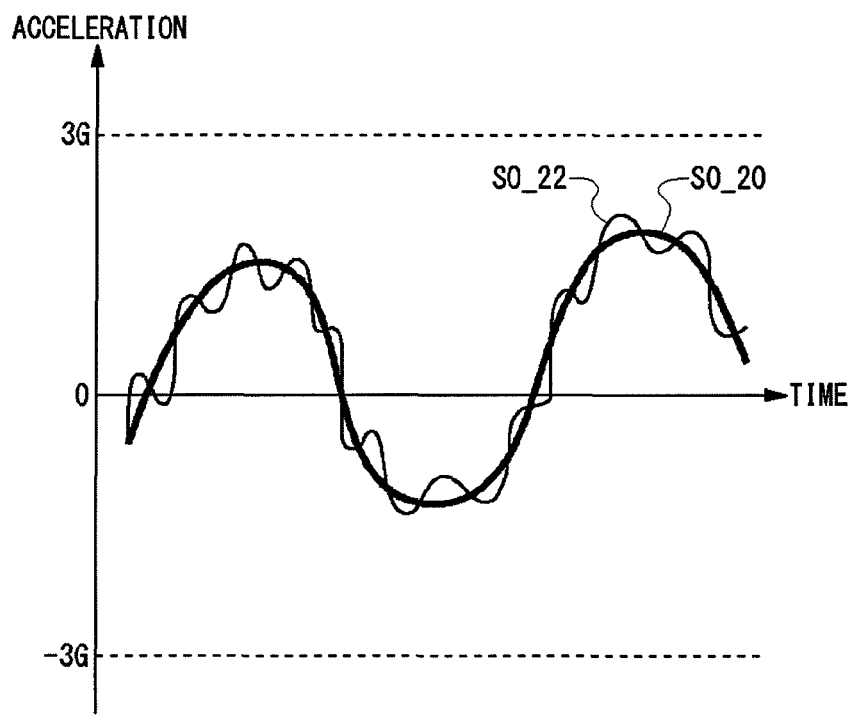

FIGS. 12A and 12B show sensor output data of the detected vibrating motion of a controller, caused by the vibrating motion of a vibrator, along with the movement of a controller, caused by the movement of a user. FIG. 12A shows a sensor output data SO_12 where the user grips the controller in a horizontal position without any vertical movements, and FIG. 12B shows a sensor output data SO_22 where the user grips the controller in a horizontal position and moves the controller up and down in a vertical direction. Compared to FIGS. 11A and 11B, FIGS. 12A and 12B show the vibrating motions of the controller 20 attributed to the vibrating motions of the vibrator 80 are superimposed on the movements of the controller 20 caused by the movements of the user.

When the vibration component of the vibrator 80 is superimposed on the sensor output data and the sensor output data is used as the game operation data to move the game character, the behavior of the game character shown is unintended to the user with respect to the game input by the movement of the user. Thus, all the noise components attributed to the vibrating motion of the vibrator 80 are preferably removed in a normal situation.

However, the inventor has acquired a knowledge through the experiment using test subjects that there is a difference in the influence given to the user by the noise component attributed to the vibration motion of the vibrator 80 between when the user moves the controller 20 and when the user does not move the controller 20. In this experiment, it was found out that the user has a tendency to have unpleasant feeling when the game character moves due to the noise component attributed to the vibrating motion of the vibrator 80 against the user's intension of making the game character to be stationary by not moving the controller 20, on the other hand, the user barely notices the effect on the game character caused by the noise component attributed to the vibrating motion of the vibrator 80 when the user moves the controller 20 with intension of moving the game character. Through this experiment, the inventor came to the finding that since it was not easy to move the controller 20 accurately as desired, the noise component of an amplitude smaller than the movement of the user can be considered to be in the error range of the movement of the user.

Therefore, the sensor output data of SO_12 shown in FIG. 12A is undesirable because the game character moves against the intention of the user wanting to fix the movement of the game character, and on the other hand, it can be seen that the sensor output data of SO_22 shown in FIG. 12B can achieve the movement of the game character without giving any unpleasant feelings to the user. The masking processing unit 118 in the embodiment corrects the sensor output data by performing the masking process on the amplitude component within the predetermined range including zero acceleration based on the above mentioned finding.

Figure 13A:
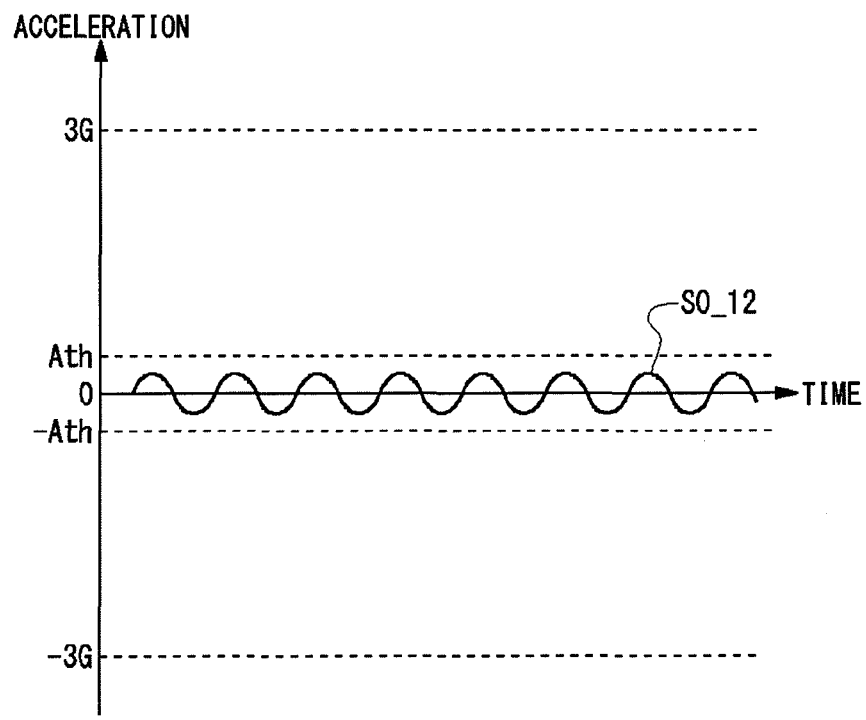
FIGS. 13A and 13B are diagrams showing the masking range of acceleration.
Figure 13B:
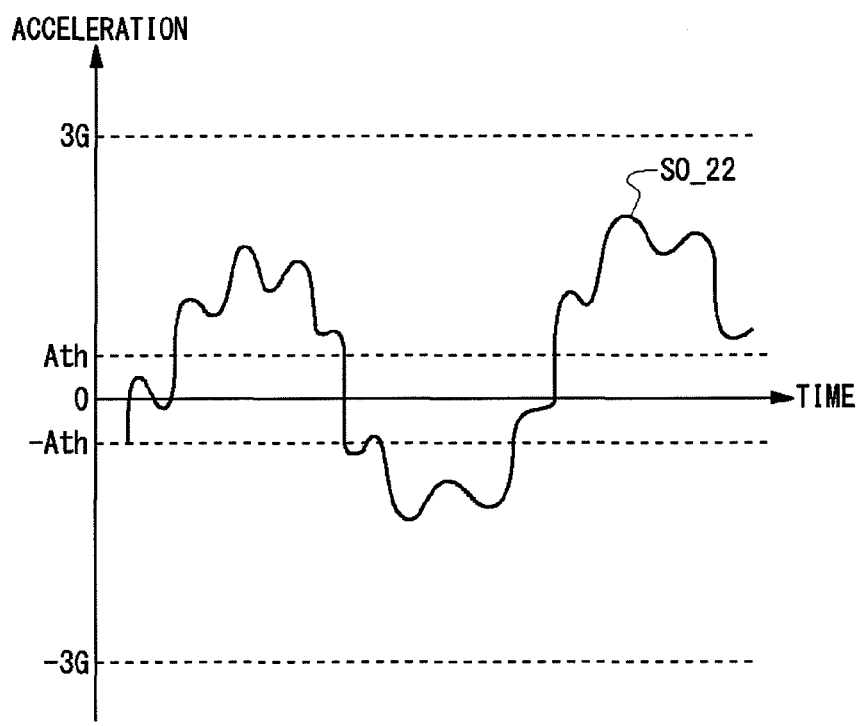

FIGS. 13A and 13B show the range of acceleration of masking. FIG. 13A shows the relation between sensor output data SO_12 and the range of masking, and FIG. 13B shows the relation between sensor output data SO_22 and the range of masking. The range of masking is set to −Ath or larger (Ath is a positive predetermined value) and to Ath or smaller, and an absolute value of a negative lower limit and a positive upper limit within the range of masking are equal. This is caused due to the noise component attributed to the vibrator 80 swings to almost evenly in the positive and negative based on the current posture of the controller 20. An absolute value of a negative lower limit and a positive upper limit within the range of masking do not need to be always equal.

Figure 14:
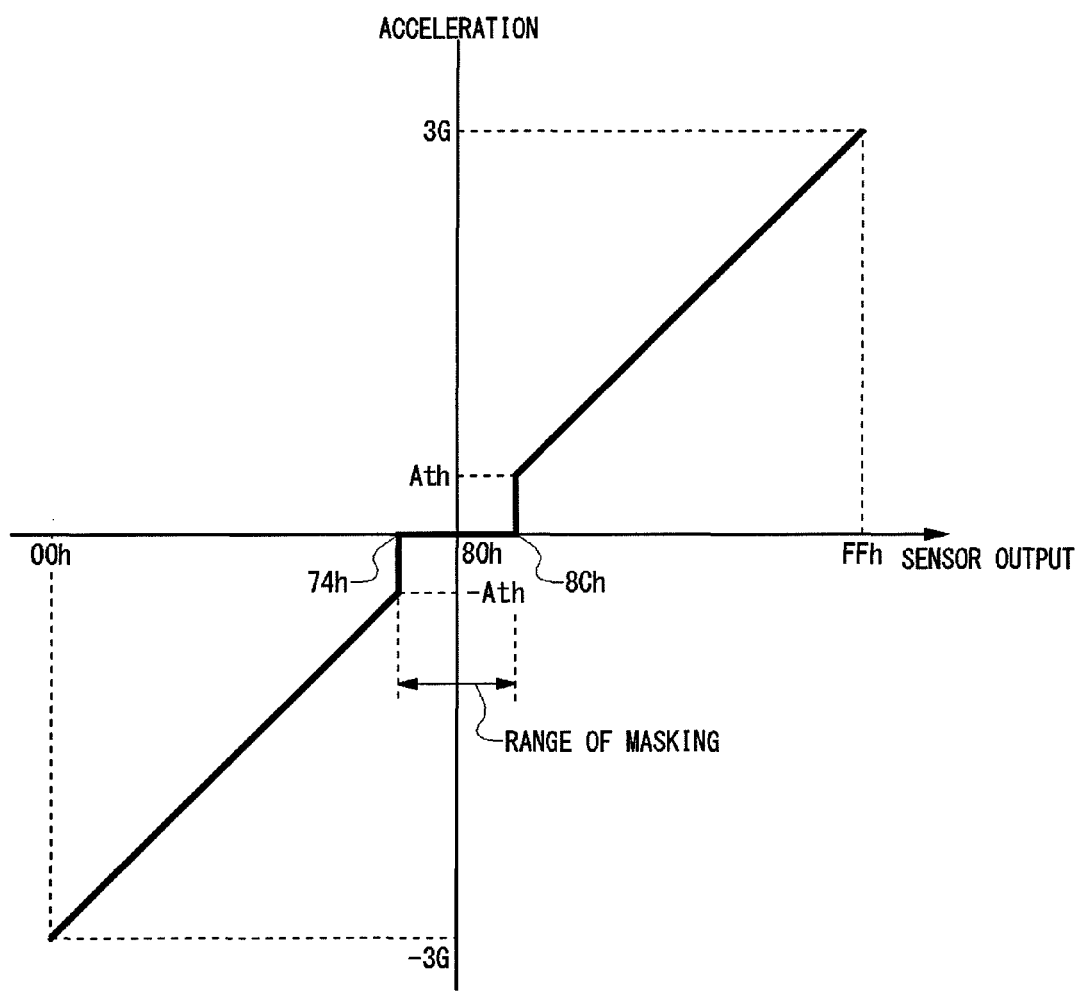
FIG. 14 is a diagram showing the relation of a sensor output data and acceleration during masking process.

FIG. 14 shows the relation of a sensor output data and acceleration during masking process. In this example, the sensor output data takes the value of FFh from 00h (hex), the sensor output data 00h corresponds to the acceleration of −3 G, and the sensor output data FFh corresponds to the acceleration of +3 G. For example, when a sensor output data 74h corresponds to the acceleration of −Ath and a sensor output data 8Ch corresponds to the acceleration of +Ath, the masking processing unit 118 corrects the acceleration to zero and outputs the zero acceleration when the sensor output data is in the range from 74h to 8Ch.

Figure 15A:
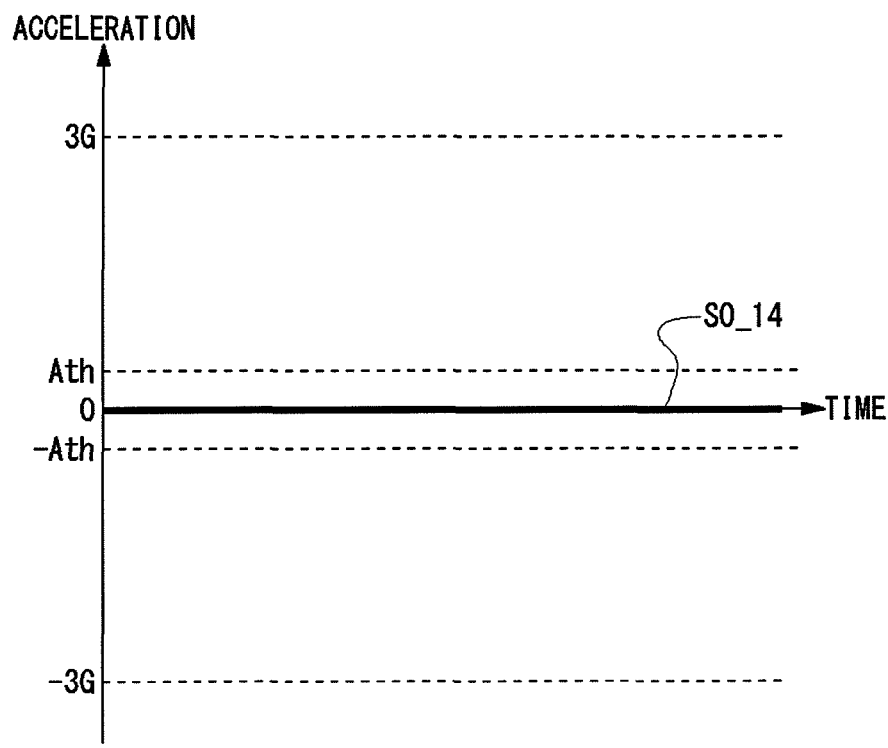
FIGS. 15A and 15B are diagrams showing the result of a masking process on the sensor output data shown in FIGS. 13A and 13B.
Figure 15B:
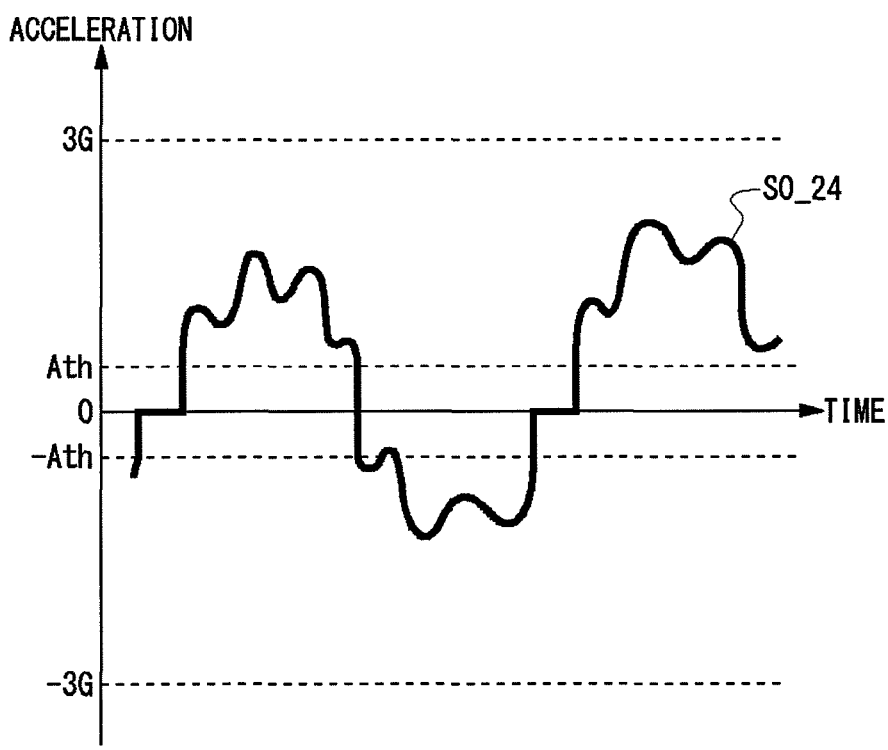

FIGS. 15A and 15B show the result of masking processing the sensor output data shown in FIGS. 13A and 13B. FIG. 15A shows a sensor output data SO_14 generated by masking processing the sensor output data SO_12, and FIG. 15B shows a sensor output data SO_24 generated by masking processing the sensor output data SO_22. The sensor output data SO_14 in FIG. 15A appropriately expresses the state of the controller 20 which is held stationary by the user by removing the acceleration element in the range of masking. On the other hand, the sensor output data SO_24 in FIG. 15B substantially expresses the movement of the controller 20 caused by the movement of the user even though the acceleration element in the range of masking is removed. Thus, the masking processing unit 118 can correct the sensor output data to the appropriate game operation data by performing the masking process on the predetermined acceleration element around zero acceleration and disregarding the acceleration element.

The masking processing unit 118 provides the corrected sensor output data to the application processor 130 as the game operation data. The application processor 130 creates the image signal and the audio signal which reflect the game operation data provided by the masking processing unit 118 in the movement of the game character along with the game operation data through, for example, the manipulation button 26, directly provided from the main controlling unit 104, and provides the image signal and the audio signal respectively to the image display device 3 and the audio output device 4 from the output unit 140.

The masking processing unit 118 may determine whether to perform the masking process based on the movement state of the controller 20. As described above, since the masking process is a process to set the acceleration element within the range of masking to be zero, when the user moves the controller 20, the motion element is masked and discarded.

The movement state determination unit 114 determines the movement state of the controller 20 and based on the result of the determination, the execution of the masking process may be controlled. More specifically, the movement state determination unit 114 acquires the sensor output data from the sensor output acquisition unit 112 and determines whether the sensor output data continues taking the value within the range of masking in succession for a predetermined period of time. The determination time may be, for example, a few seconds. When the movement state determination unit 114 determines that the sensor output data continues taking the value within the range of masking for the predetermined period of time, the movement state determination unit 114 notifies the masking processing unit 118 of the determination result. Upon the reception of the determination result, the masking processing unit 118 starts performing the masking process on the sensor output data. When the movement state determination unit 114 determines that the sensor output data takes the value outside the range of masking, the movement state determination unit 114 notifies the masking processing unit 118 of the determination result. Upon the reception of the determination result, the masking processing unit 118 terminates performing the masking process on the sensor output data. As described above, having the movement state determination unit 114 monitor the movement state of the controller 20, the masking processing unit 118 can perform the masking process at an appropriate time.

The movement state of the controller 20 may be determined by whether the vibrator 80 is vibrating. A vibration controlling signal creation unit 120 creates the vibration controlling signal by the instruction from the application processor 130 and provides the vibration controlling signal to the main controlling unit 104. Upon the reception of the vibration controlling signal, the communication controlling unit 102 transmits the vibration controlling signal to the controller 20 from the wireless communication module 100. As stated above, since the vibrator 80 of the controller 20 is controlled by the vibration controlling signal created by the vibration controlling signal creation unit 120, the approach to determine the movement state of the controller 20 is also effective by using the control.

More specifically, a vibration state determination unit 116 receives the vibration controlling signal from the vibration controlling signal creation unit 120. As a result, the vibration state determination unit 116 determines whether the vibrator 80 will start or terminate the vibration. Upon the reception of the vibration starting signal, the vibration state determination unit 116 determines that the vibrator 80 is in the state to vibrate and notifies the masking processing unit 118 of the determination result. Upon the reception of the notification, the masking processing unit 118 starts performing the masking process on the sensor output data. Upon the reception of the vibration terminating signal, the vibration state determination unit 116 determines that the vibrator 80 is in the state to terminate the vibration and notifies the masking processing unit 118 of the determination result. Upon the reception of the notification, the masking processing unit 118 terminates the masking process on the sensor output data. It takes a certain amount of time until the inertia rotation of the eccentric member 86 stops after the vibration terminating signal is provided to the controller 20 followed by the termination of the voltage application to the motor 82. Therefore, taking the time required for the rotation of the eccentric member 86 to stop after the termination of the voltage application into consideration, the masking processing unit 118 may stop the masking process after the predetermined period after the reception of the notification. As described above, having the vibration state determination unit 116 determines whether the controller 20 is in the state to vibrate sympathetically with the vibrating motion of the vibrator 80, the masking processing unit 118 can perform the masking process at an appropriate time.

In controlling the masking process using the movement state determination unit 114 and the vibration state determination unit 116, the controlling can be done using the movement state determination unit 114 or the vibration state determination unit 116 alone. However, by combining the movement state determination unit 114 and the vibration state determination unit 116, the masking process in which the movement state of the controller 20 is reflected can be achieved. When the masking process is controlled using the combination of the movement state determination unit 114 and the vibration state determination unit 116, the masking process control based on the determination result of the vibration state by the vibration state determination unit 116 may be given priority over the masking process control based on the determination result of the movement state by the movement state determination unit 114. Since the vibrating motion of the controller 20 attributed to the vibrating motion of the vibrator 80 is not generated if the vibrator 80 is not vibrating, better control of the masking process can be achieved by determining whether the vibrator 80 is vibrating.

Described above is an explanation based on the embodiments of the present invention. These embodiments are intended to be illustrative only and it will be obvious to those skilled in the art that various modifications to constituting elements and processes could be developed and that such modifications are also within the scope of the present invention. In the embodiments, the example of performing the masking process on the acceleration sensor output data is explained. By performing the masking process on the angular velocity sensor output data in the same way, the vibration component of the controller 20 attributed to the vibrating motion of the vibrator 80 can be removed or reduced from the angular velocity sensor.

In the embodiment, the game device 10 has the function of correcting the sensor output data. However, the function of correcting the sensor output data may be realized by the controller 20. For example, by placing the masking processing unit 118 in the subsequent stage of the analog-to-digital conversion device 64 or the averaging processing block 68 in the controller 20, the controller 20 can have the function of correcting the sensor output data. In this case, the functions of the movement state determination unit 114 and the vibration state determination unit 116 can be realized by the main controlling unit 50.

What is claimed is:

1. A game controller operative to transmit game operation data to a game device, comprising:
    a housing;
    a motion sensor operative to detect a movement of the game controller;
    a low pass filter installed at an output of the motion sensor; and
    at least one vibrator which is driven by a vibration controlling signal sent from the game device,
    wherein the motion sensor, the low pass filter and the at least one vibrator are placed inside the housing, the at least one vibrator being fixed to the housing,
    a cutoff frequency of the low pass filter is set lower than a natural vibration frequency of the game controller,
    wherein the cutoff frequency of the low pass filter is set so that at least a part of a vibration component of the housing attributed to a vibrating motion of the vibrator can be removed, while the movement of the controller caused by a movement of a user can be output from the low pass filter, and
    wherein the cutoff frequency of the low pass filter is set with reference to a duration of transmission cycle of game operation data.

2. The game controller according to claim 1, wherein the cutoff frequency of the low pass filter is set to two thirds or less of a peak value of the natural vibration frequency of the game controller.

3. The game controller according to claim 1, wherein the low pass filter is configured so that filter circuits which have different cutoff frequencies can be selectively used.

4. The game controller according to claim 1, wherein the natural vibration frequency of the game controller is approximately 22 Hz and the cutoff frequency of the low pass filter is set to a predetermined value of 15 Hz or less.

5. The game controller according to claim 1, further comprising:
    a wireless communication module operative to transmit an output data of the motion sensor at a predetermined cycle, wherein
    a lag time caused by the low pass filter is set shorter than twice a duration of transmission cycle of the wireless communication module.

6. The game controller according to claim 5 wherein the lag time caused by the low pass filter is set shorter than the duration of transmission cycle of the wireless communication module.

7. The game controller according to claim 1, further comprising;
    a wireless communication module operative to transmit an output data of the motion sensor at a predetermined cycle;
    another low pass filter installed between the motion sensor and the low pass filter, wherein
    a lag time caused by the low pass filters in two stages is set shorter than twice a duration of transmission cycle of the wireless communication module.

8. The game controller according to claim 7 wherein the lag time caused by each of the low pass filters which constitute a two-stage low pass filter is set shorter than the duration of transmission cycle of the wireless communication module.

9. The game controller according to claim 1, wherein
    the motion sensor includes at least one acceleration sensor and an angular velocity sensor, further comprising:
    a passive filter installed between the acceleration sensor and the low pass filter; and
    an active filter installed between the angular velocity sensor and the low pass filter.

* * * * *